(12) United States Patent
Horisaki

(10) Patent No.: US 6,990,318 B2
(45) Date of Patent: Jan. 24, 2006

(54) MULTI-CARRIER COMMUNICATION APPARATUS

(75) Inventor: Koji Horisaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 461 days.

(21) Appl. No.: 10/235,828

(22) Filed: Sep. 6, 2002

(65) Prior Publication Data

US 2003/0060165 A1 Mar. 27, 2003

(30) Foreign Application Priority Data

Sep. 26, 2001 (JP) ............................. 2001-295107

(51) Int. Cl.
*H04B 7/00* (2006.01)
(52) U.S. Cl. ................... 455/59; 455/63.1; 455/65; 455/67.14; 455/504; 370/203; 375/260
(58) Field of Classification Search ................. 455/59, 455/504, 506, 63.1, 65, 67.11, 67.13, 67.14, 455/69; 370/203, 208, 319, 344; 375/260
See application file for complete search history.

(56) References Cited

U.S. PATENT DOCUMENTS

| 5,867,528 | A | | 2/1999 | Verbueken |
| 5,901,185 | A | * | 5/1999 | Hassan ..................... 375/346 |
| 6,567,374 | B1 | * | 5/2003 | Bohnke et al. ............ 370/203 |

FOREIGN PATENT DOCUMENTS

| JP | 2982797 | 9/1999 |
| JP | 2000-151732 | 5/2000 |
| JP | 2001-77788 | 3/2001 |
| JP | 2001-339363 | 12/2001 |
| JP | 2003-60609 | 2/2003 |

OTHER PUBLICATIONS

Mª Julia Fernandez-Getino Garcia, et al. "Efficient Pilot Patterns for Channel Estimation in OFDM Systems Over HF Channels", Proceedings of 50th Vehicular Technology Conference, 1999, pp. 2193-2197.

* cited by examiner

*Primary Examiner*—Lee Nguyen
(74) *Attorney, Agent, or Firm*—Oblon, Spivak, McClelland, Maier & Neustadt, P.C.

(57) ABSTRACT

A multi-carrier communications apparatus which communicates between a first station and a second station as a destination station using a reference signal used for estimating a state of a channel, the multi-carrier communications apparatus comprising a multi-carrier modulator which modulates data on a plurality of subcarriers, a transmission unit configured to transmit the reference signal together with the data modulated to the destination station every subcarrier, and a control unit configured to control a reference signal transmission pattern according to a given communication condition, the reference signal transmission pattern including a transmission interval of the reference signal transmitted by the transmission unit.

15 Claims, 12 Drawing Sheets

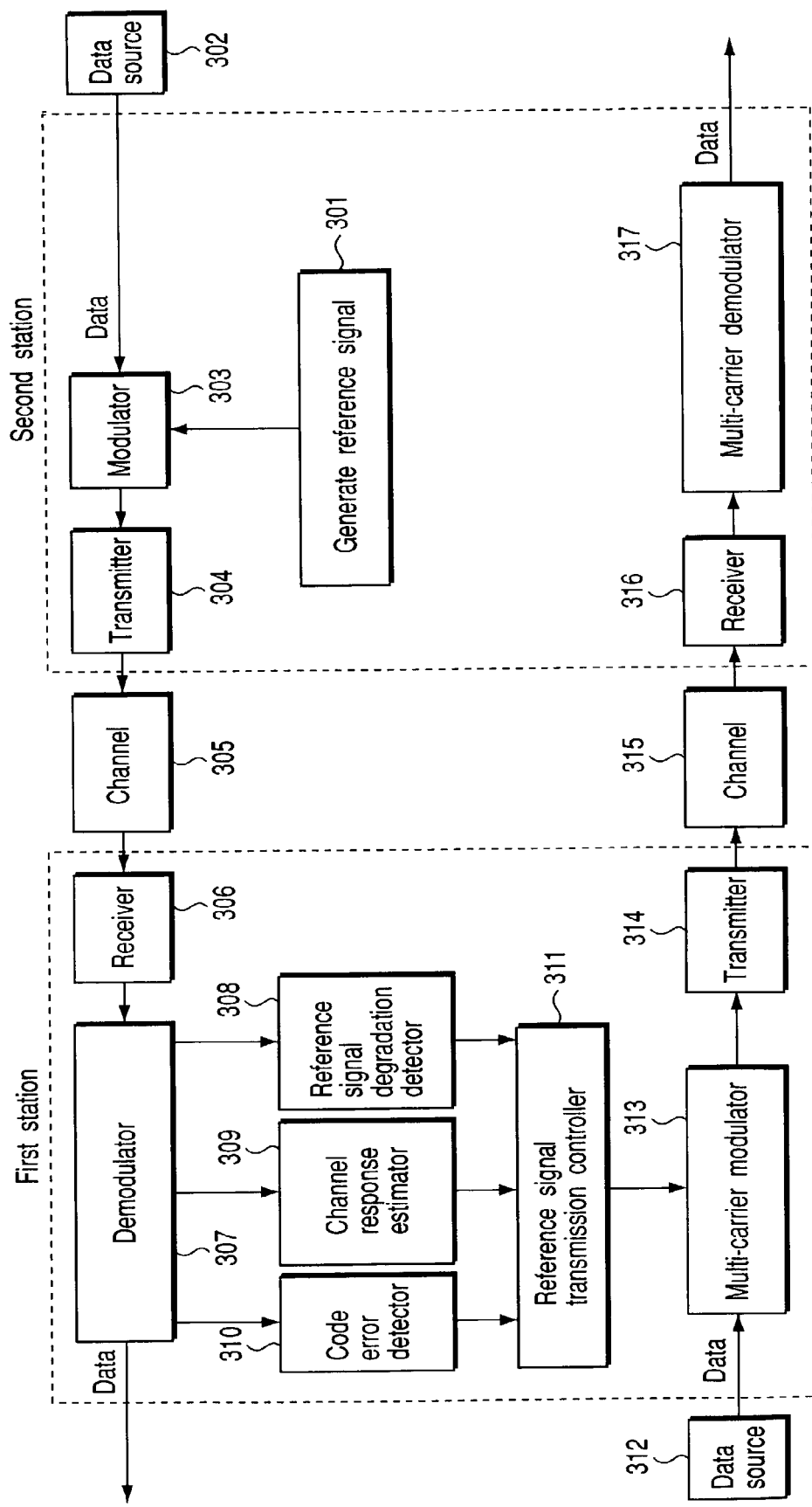
F I G. 3

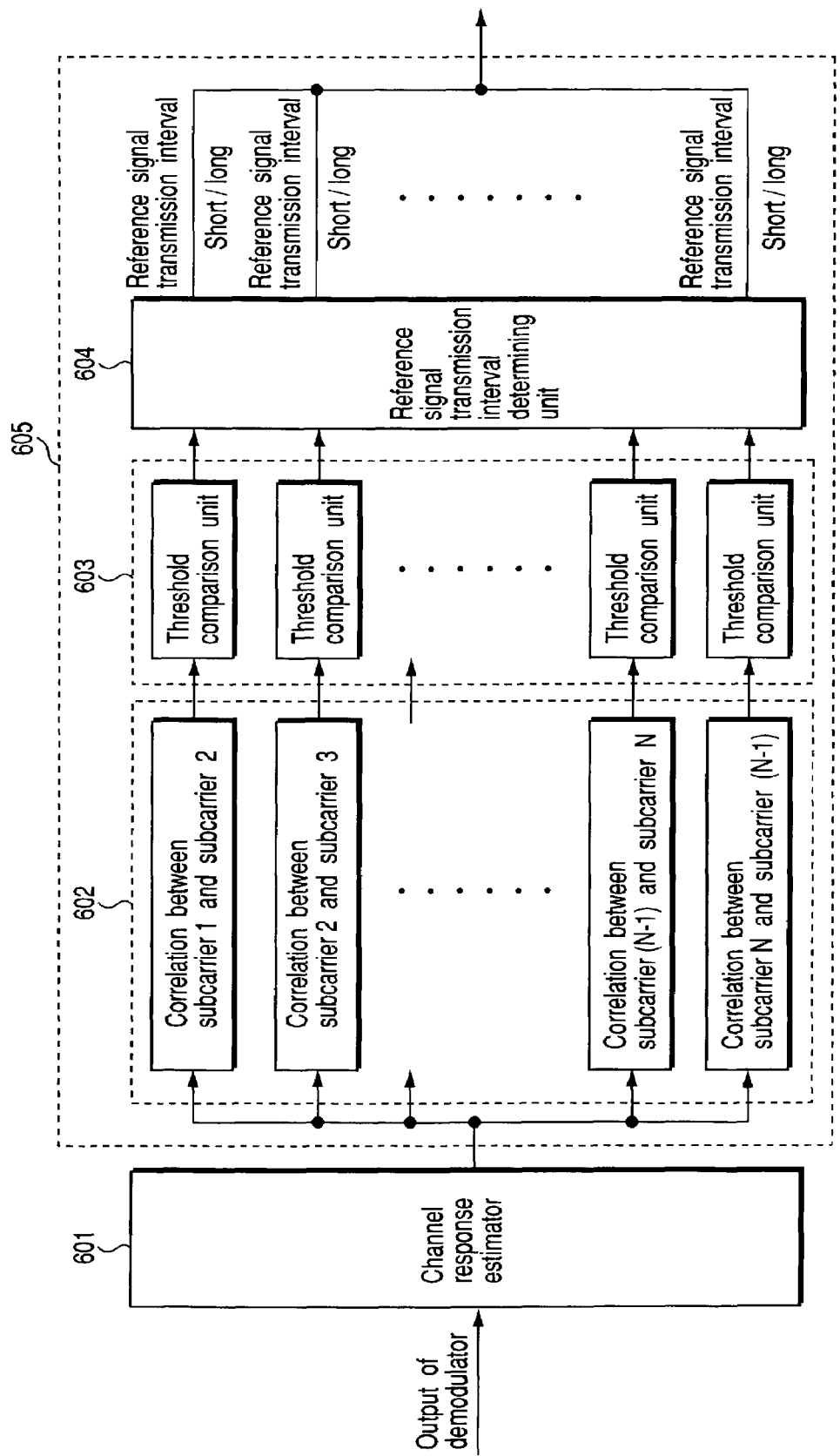
F I G. 6

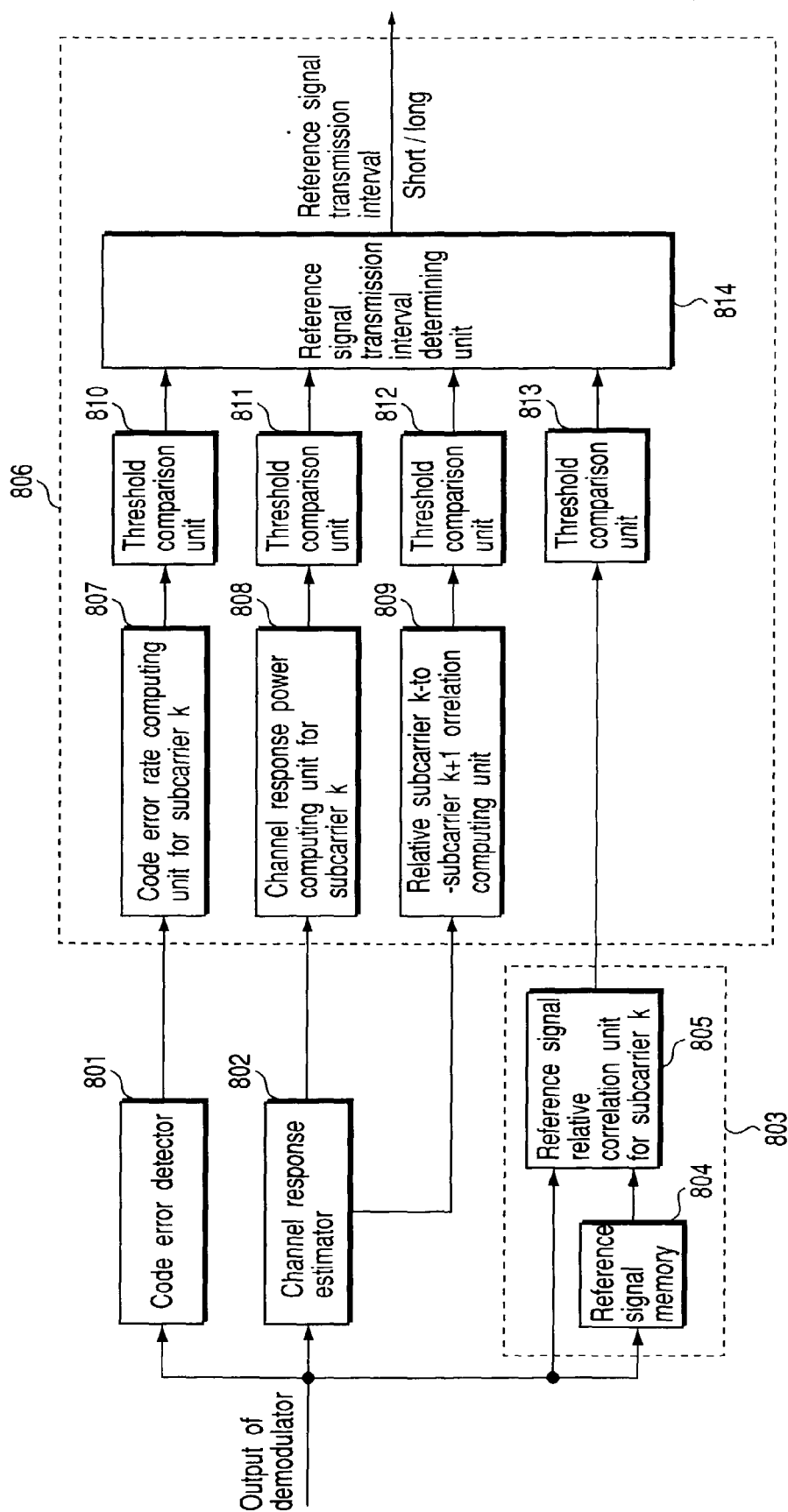
F I G. 8

MULTI-CARRIER COMMUNICATION APPARATUS

CROSS-REFERENCE TO RELATED APPLICATIONS

This application is based upon and claims the benefit of priority from the prior Japanese Patent Application No. 2001-295107, filed Sep. 26, 2001, the entire contents of which are incorporated by reference.

BACKGROUND OF THE INVENTION

1. Field of the Invention

The present invention relates to a multi-carrier communication apparatus for use in a multi-carrier transmission system that is used to estimate the state of the channel using a reference signal.

2. Description of the Related Art

At present, the role of data transmission by radio is gaining more and more importance, due to the popularization of cellular phones, wireless LANs, and digital broadcast. In light of portability, ease of installation and cost, radio data transmission is significantly advantageous over wired data transmission. On the other hand, as radio is affected by the state of the airwaves, this affects the state of the channel used, thus also the communication quality. Communication can be seriously degraded, due to the phenomenon of multi-reflection radio propagation (multi-path).

Multi-carrier transmission, in which data is modulated into plural subcarriers and then transmitted, is known as a system for reducing the influence of multi-path. OFDM (Orthogonal Frequency Division Multiplexing) is one such transmission system. On the other hand, to cope with the changes in the channel state, a method of estimating the state of the channel has been developed. In this method, a known reference signal, called a pilot signal, is inserted into the data (data signal).

The above multi-carrier transmission and reference signal transmission are effective for removing the influence suffered in the transmitted data on the channel. However, if both transmissions are combined, an optimum reference signal may be different every subcarrier. In the prior art, dynamic and appropriate control of the reference signal is not executed for each subcarrier. Accordingly, the communication quality may significantly degrade. Also, the redundant reference signal is transmitted, resulting in increasing the redundancy of the transmission.

BRIEF SUMMARY OF THE INVENTION

It is an object of the invention to provide a multi-carrier communication apparatus capable of realizing high communication quality irrespective of changes in the channel, while suppressing the unnecessary transmission of a reference signal.

According to an aspect of the present invention, there is provided a multi-carrier communications apparatus which communicates between a first station and a second station as a destination station using a reference signal used for estimating a state of a channel, the multi-carrier communications apparatus comprising: a multi-carrier modulator which modulates data on a plurality of subcarriers; a transmission unit configured to transmit the reference signal together with the data modulated to the destination station every subcarrier; and a control unit configured to control a reference signal transmission pattern according to a given communication condition, the reference signal transmission pattern including a transmission interval of the reference signal transmitted by the transmission unit.

According to another aspect of the present invention, there is provided A multi-carrier communications apparatus which communicates between a first station and a second station as a destination station using a reference signal used for estimating a state of a channel, the multi-carrier communications apparatus comprising: a multi-carrier modulator provided in the first station to modulate data on a plurality of subcarriers; a transmission unit provided in the first station and configured to transmit the reference signal together with the data modulated to the destination station; and a control unit provided in the first station and configured to receive at least one of a communication quality in transmitting data to the destination station, a response of the channel, and a degradation degree of the reference signal which is sent from the destination station, and control a reference signal transmission pattern according to at least one of the communication quality, the response and the degradation degree of the reference signal, the reference signal transmission pattern including a transmission interval of the reference signal transmitted by the transmission unit.

According to another aspect of the present invention, there is provided a multi-carrier communications apparatus which communicates between a first station and a second station as a destination station using a reference signal used for estimating a state of a channel, multi-carrier communications apparatus comprising: a multi-carrier modulator provided in the first station to modulate data on a plurality of subcarriers; a transmission unit provided in the first station and configured to transmit the reference signal together with the data modulated to the destination station; and a control unit provided in the first station and configured to detect at least one of a communication quality in transmitting data to the destination station, a response of the channel, and a degradation degree of the reference signal which is sent from the destination station, and control a reference signal transmission pattern according to at least one of the communication quality, the response and the degradation degree of the reference signal, the reference signal transmission pattern including a transmission interval of the reference signal transmitted by the transmission unit.

BRIEF DESCRIPTION OF THE SEVERAL VIEWS OF THE DRAWING

FIG. 3 is a block diagram illustrating a multi-carrier transmission system according to a second embodiment of the invention;

FIG. 6 is a block diagram illustrating a response estimator and reference signal transmission controller according to a modification of the embodiments of the invention;

FIG. 8 is a block diagram illustrating a reference signal degradation detector, code error detector, response estimator and reference signal transmission controller employed in the embodiments of the invention;

DETAILED DESCRIPTION OF THE INVENTION

Embodiments of the invention will be described in detail with reference to the accompanying drawings.

(First Embodiment)

Figure 1:
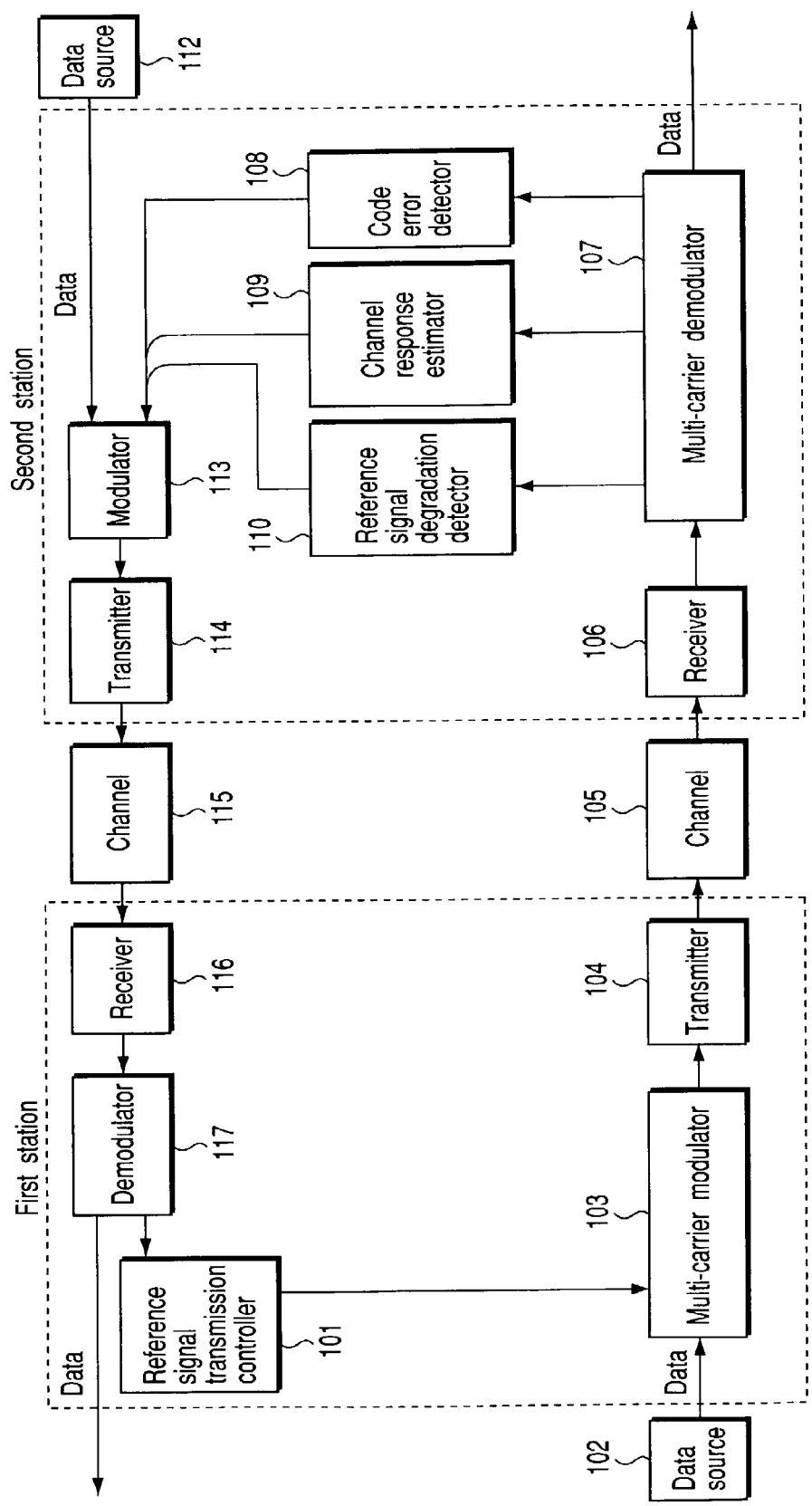
FIG. 1 is a block diagram illustrating a multi-carrier transmission system according to a first embodiment of the invention.

FIG. 1 shows a multi-carrier transmission system according to a first embodiment of the invention. As shown, the multi-carrier transmission system comprises a station 1 (self-station) as a multi-carrier communication apparatus according to the invention, and a destination station 2 that communicates with the self-station 1. In this embodiment, the transmission pattern of a reference signal, which is inserted in the data transmitted from the station 1 to the station 2, is controlled on the basis of the signal received by the station 2 (i.e., the signal transmitted from the station 1 to the station 2).

Firstly, in the station 1, a reference signal and reference signal transmission pattern data output from a reference signal transmission controller 101, and transmission data output from a data source 102 are input to a multi-carrier modulator 103. The multi-carrier modulator 103 modulates the transmission data into plural subcarriers (multi-carrier) by multi-carrier modulation such as OFDM modulation.

In the multi-carrier modulator 103, a reference signal from the reference signal transmission controller 101 is superimposed upon the transmission data on the basis of reference signal transmission pattern information from the reference signal transmission controller 101. The signal output from the multi-carrier modulator 103 is input to a transmitter 104, where it is converted into a signal suitable for propagation through a channel 105. The output signal is transmitted to the station 2 from an antenna (not shown) via the channel 105.

On the other hand, in the station 2, the signal transmitted from the station 1 via the channel 105 is received by an antenna (not shown). The received signal supplied from the antenna is input to a receiver 106, where it is subjected to a process reverse to the process executed in the transmitter 104 of the station 1. The signal output from the receiver 106 is input to a multi-carrier demodulator 107, where it is subjected to multi-carrier demodulation. Thus, the received signal is subjected to a process reverse to the process executed in the multi-carrier modulator 103 of the station 1, whereby the data and reference signal are reproduced.

The signal output from the multi-carrier demodulator 107 is input to a code error detector 108, response estimator 109 and reference signal degradation detector 110. The code error detector 108 detects the communication quality with which data is transmitted from the station 1 to the station 2.

The response estimator 109 estimates the response (the response characteristic of the channel 105). The reference signal degradation detector 110 calculates the correlation between the presently received reference signal and previously received reference signal, thereby detecting the degree of degradation of the reference signal.

The code error occurrence data output from the code error detector 108, response data output from the response estimator 109, reference signal degradation data output from the reference signal degradation detector 110, and transmission data output from a data source 112 are input to a modulator 113, where they are subjected to predetermined modulation. The signal output from the modulator 113 is input to a transmitter 114, where it is converted into a signal suitable for propagation through the channel 115. The output signal is transmitted to the station 1 from an antenna (not shown) via the channel 115.

The signal thus transmitted from the station 2 to the station 1 is received by the antenna (not shown) of the station 1. The received signal supplied from the antenna is input to a receiver 116, where it is subjected to a process reverse to the process executed in the transmitter 114 of the station 2. The signal output from the receiver 116 is input to a demodulator 117, where it is subjected to predetermined demodulation that is reverse to the process executed in the modulator 113 of the station 2. As a result, data is reproduced. The signal output from the receiver 116 is also input to the reference signal transmission controller 101. On the basis of the input signal, the controller 101 determines the transmission pattern that includes the transmission interval of the reference signal. The specific configuration of the reference signal transmission controller 101 will be described in detail later.

As described above, according to the embodiment, in the station 2 as the reference signal receiving side, the code error detector 108, response estimator 109 and reference signal degradation detector 110 generate signals, serving as setting indexes for setting the reference signal transmission pattern, on the basis of the signal transmitted thereto from the station 1 via the multi-carrier demodulator 107. These index signals are transmitted from the station 2 to the station 1, and are used to control the transmission pattern of the reference signal, i.e., pilot signal, transmitted from the reference signal transmission controller 101 of the station 1 to the station 2. As a result, the degradation of the communication quality and the unnecessary transmission of the reference signal can be suppressed.

The embodiment may be modified such that the data source 112 and modulator 113 are omitted from the station 2. In this case, the demodulator 117 is also omitted from the station 1. Further, the channel 105 from the station 1 to the station 2 may be identical to or differ from the channel 115 from the station 2 to the station 1. The configuration of the embodiment is especially effective in the latter case, i.e., in the case of an asymmetric channel (interactive channel).

(Specific Example of Criterion Signal Transmission Pattern)

Figure 2:
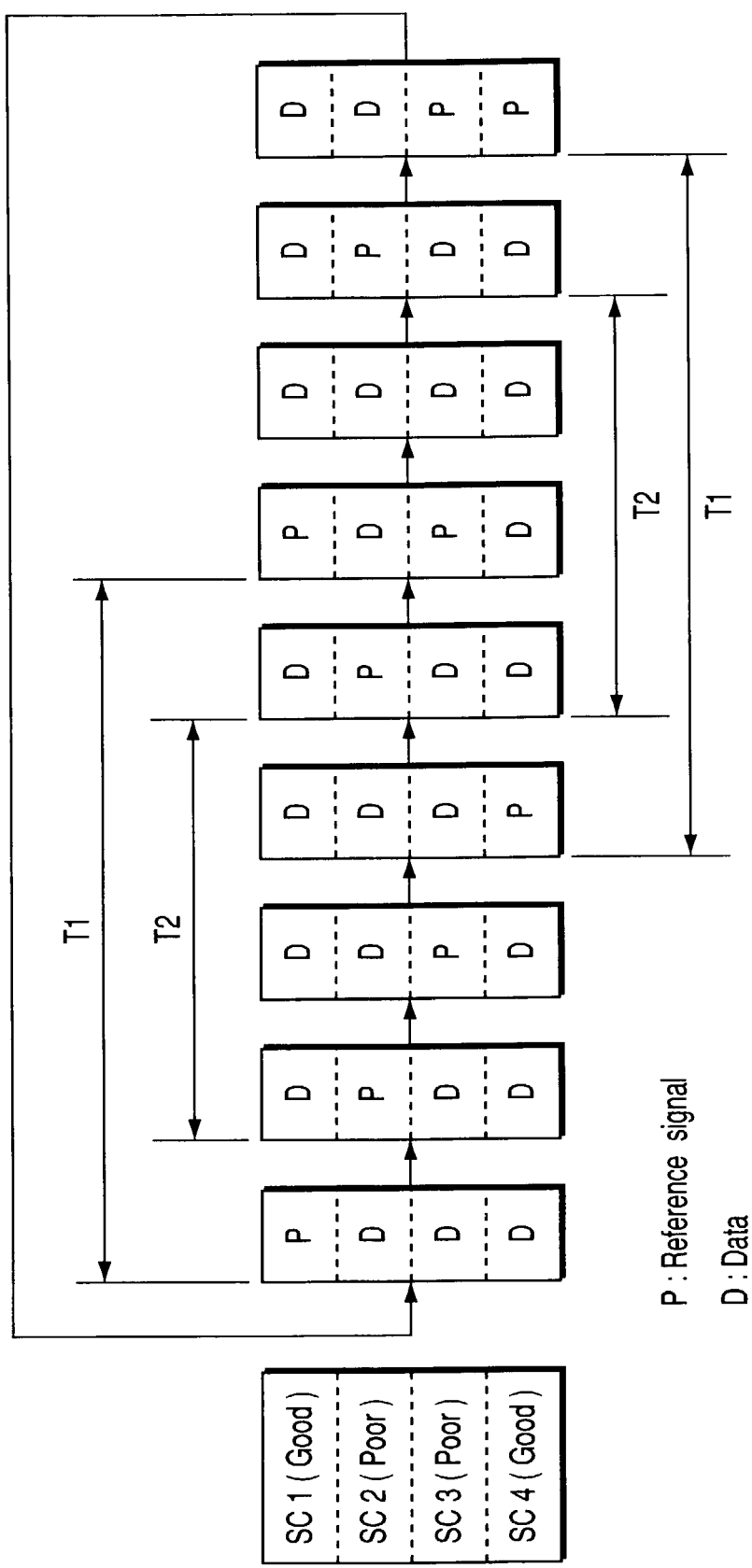
FIG. 2 is a view illustrating a reference signal transmission pattern employed in the embodiment.

FIG. 2 is an example of the reference signal transmission pattern. In this example, the multi-carrier communication system uses a signal of four subcarriers. In FIG. 2, numbers 1–4 are assigned to subcarriers SC1–SC4 in the order beginning from the lowest frequency. In the example, suppose that the subcarriers SC1 and SC4 have relatively superior transmission characteristics, and the subcarriers SC2 and SC3 have relatively inferior transmission characteristics.

In this case, the transmission pattern (transmission interval) of the reference signal P is set so that the reference signal transmission interval (T1) for the subcarriers SC1 and SC4 is longer than the reference signal transmission interval (T2) for the subcarriers SC2 and SC3. The control of the reference signal transmission pattern, in particular, the reference signal transmission interval, for each subcarrier can suppress degradation of the communication quality and the unnecessary transmission of the reference signal.

(Second Embodiment)

FIG. 3 shows a multi-carrier transmission system according to a second embodiment of the invention, which comprises, as in the first embodiment, a station 1 (self-station) as a multi-carrier communication apparatus according to the invention, and a destination station 2 that communicates with the self-station 1. In this embodiment, the transmission pattern of a reference signal, which is inserted in the data transmitted from the station 1 to the station 2, is controlled on the basis of the signal received by the station 2 (i.e., the signal transmitted from the station 1 to the station 2).

Firstly, in the station 2, a predetermined reference signal output from a reference signal generator 301, and data output from a data source 302 are input to a modulator 303, where they are subjected to predetermined modulation. The signal output from the modulator 303 is input to a transmitter 304, where it is converted into a signal suitable for propagation through a channel 305 in a radio network. The output signal is transmitted to the station 1 from an antenna (not shown) via the channel 305.

The signal transmitted from the station 2 to the station 1 is received by the station 1 via an antenna (not shown). The received signal supplied from the antenna is input to a receiver 306, where it is subjected to a process reverse to the process executed in a transmitter 304 incorporated in the station 2. The signal output from the receiver 306 is input to a demodulator 307, where it is subjected to predetermined demodulation reverse to the process executed in a modulator 303 in the station 2. As a result, data reproduction is executed.

The signal output from the demodulator 307 is input to a code error detector 308 for detecting a code error, response estimator 309 for estimating the response, and reference signal degradation detector 310 for calculating the correlation between the presently received reference signal and previously received reference signal, thereby detecting the degree of degradation of the reference signal.

The code error occurrence data output from the code error detector 308, response data output from the response estimator 309, and reference signal degradation data output from the reference signal degradation detector 310 are input to a reference signal transmission controller 311. On the basis of the input signals, the reference signal transmission controller 311 determines a reference signal transmission pattern including the transmission interval of the reference signal. The specific configuration of the reference signal transmission controller 311 will be described in detail later.

The reference signal output form the reference signal transmission controller 311 and the data output from a data source 312 are input to a multi-carrier modulator 313, where they are modulated into plural subcarriers (multi-carrier) by multi-carrier modulation. The signal output from the multi-carrier modulator 313 is input to a transmitter 314, where it is converted into a signal suitable for propagation through a channel 315. The output signal is transmitted to the station 2 from an antenna (not shown) via the channel 315.

On the other hand, in the station 2, the signal transmitted from the station 1 via the channel 315 is received by an antenna (not shown). The received signal supplied from the antenna is input to a receiver 316, where it is subjected to a process reverse to the process executed in the transmitter 314 of the station 1. The signal output from the receiver 316 is input to a multi-carrier demodulator 317, where it is subjected to multi-carrier demodulation, thereby reproducing data. This embodiment is especially effective if the channel 305 from the station 2 to the station 1 is identical to or similar to the channel 315 from the station 1 to the station 2, i.e., in the case of so-called symmetrical channels.

Thus, according to the embodiment, in the station 1 as the reference signal transmission side, the code error detector 308, response estimator 309 and reference signal degradation detector 310 generate signals, serving as setting indexes for setting the reference signal transmission pattern, on the basis of the signal transmitted thereto from the station 2 via the demodulator 307. The index signals are used to control the transmission pattern of the reference signal, i.e., pilot signal, transmitted from the reference signal transmission controller 311 of the station 1 to the station 2. As a result, the degradation of the communication quality and the unnecessary transmission of the reference can be suppressed.

Furthermore, the control of the transmission pattern of the reference signal using data acquired in the station 1 as the reference signal transmission side enables the above-mentioned advantages to be obtained without making the configuration of the station 2 complicated. As a result, the station 2 can be made compact and light. This means that this embodiment is especially effective if it is used in a mobile radio communication system in which, for example, the station 1 is a base station, and the station 2 is a mobile terminal (portable terminal).

(Code Error Detector and Criterion Signal Transmission Controller)

Figure 4:
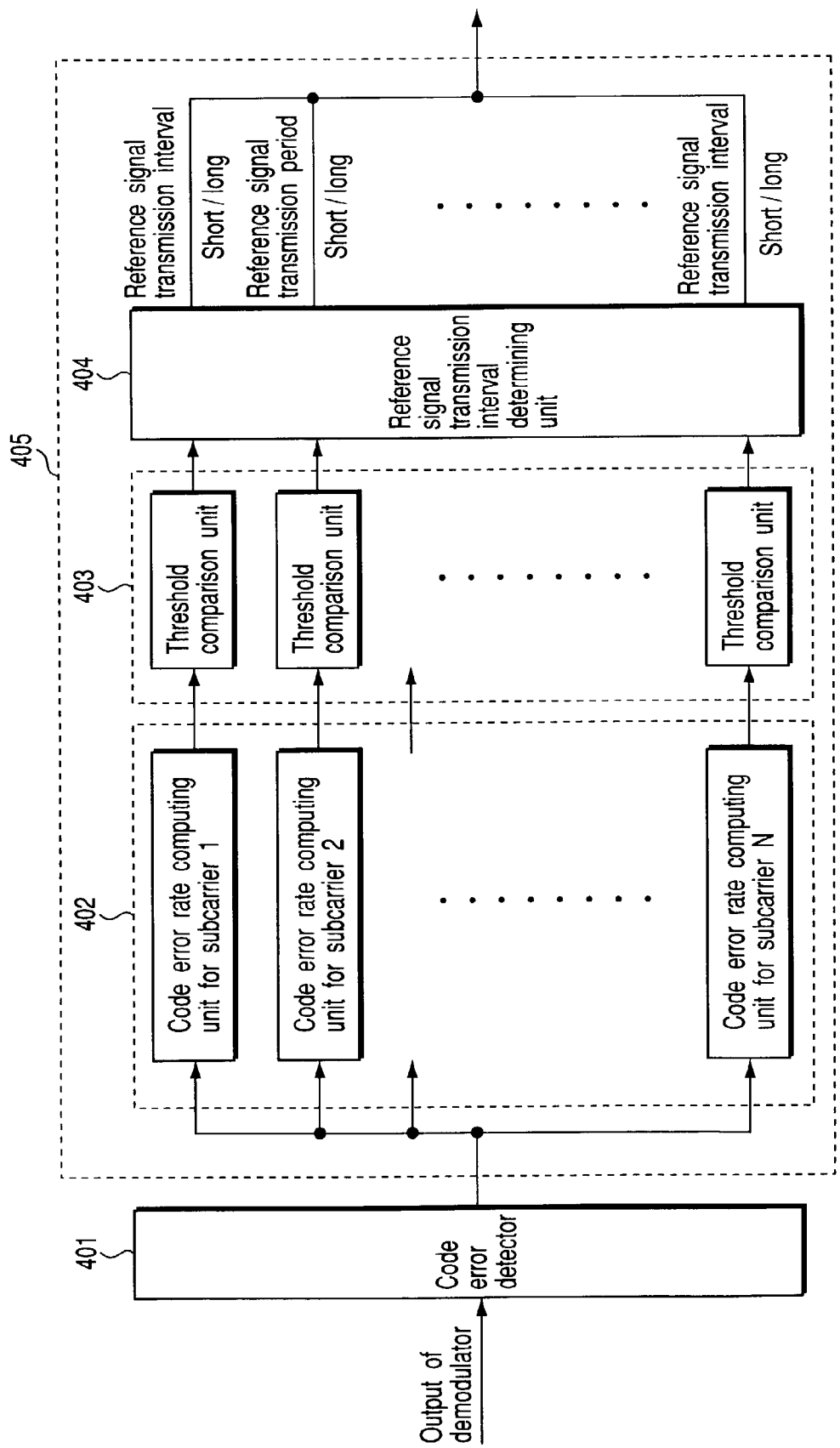
FIG. 4 is a block diagram illustrating a code error detector and reference signal transmission controller employed in the embodiments of the invention.

FIG. 4 shows a specific configuration example of the code error detector and reference signal transmission controller. In this case, a short reference signal transmission interval is assigned to those of a number N of subcarriers, in which the frequency of occurrence of a code error exceeds a threshold value. The configuration of FIG. 4 is assumed to be employed in the second embodiment shown in FIG. 2.

In FIG. 4, a reference signal transmission controller 405 (corresponding to the reference signal transmission controller 311 of FIG. 3) comprises the same number of subcarrier code error computing units 402 and threshold comparison units 403 as the number N of subcarriers, and a reference signal transmission determining unit 404.

The code error occurrence data output from a code error detector 401 (corresponding to the code error detector 310 of FIG. 3) is input to each subcarrier code error computing unit 402, whereby the code error rate (code error occurrence frequency) of each subcarrier is computed. The signal output from the subcarrier code error computing unit 402 is input to the threshold comparison unit 403, where it is subjected to a determination, using a threshold value, as to a code error rate. In other words, whether or not the code error rate exceeds the threshold value is determined. The signal output from the threshold comparison unit 403 is input to the reference signal transmission determining unit 404. If the code error rate in a certain subcarrier exceeds the threshold value, the reference signal transmission determining unit 404 determines reference signal transmission intervals for the subcarriers so that a short reference signal transmission interval (for example, T2 in FIG. 2) is set for the certain subcarrier.

The threshold comparison units 403 may use a single threshold value for all the subcarriers, or may use different threshold values for different subcarriers, or may use a common threshold value for subcarriers fewer than the number N of subcarriers. Further, the threshold value may be a preset fixed value or may be a dynamically variable value.

The determination of the reference signal transmission interval for each subcarrier in accordance with the frequency of occurrence of a code error can suppress the degradation of the communication quality and the unnecessary transmission of the reference signal.

The configuration shown in FIG. 4 is applicable to the embodiment shown in FIG. 1. In this case, the modulator 113, transmitter 114, channel 115, receiver 116 and demodulator 117 shown in FIG. 1 are interposed between the code error detector 401 and reference signal transmission controller 405. However, the reference signal transmission controller 405 operates in the same manner as the above.

(First Examples of Transmission Channel Response Estimator and Criterion Signal Transmission Controller)

Figure 5:
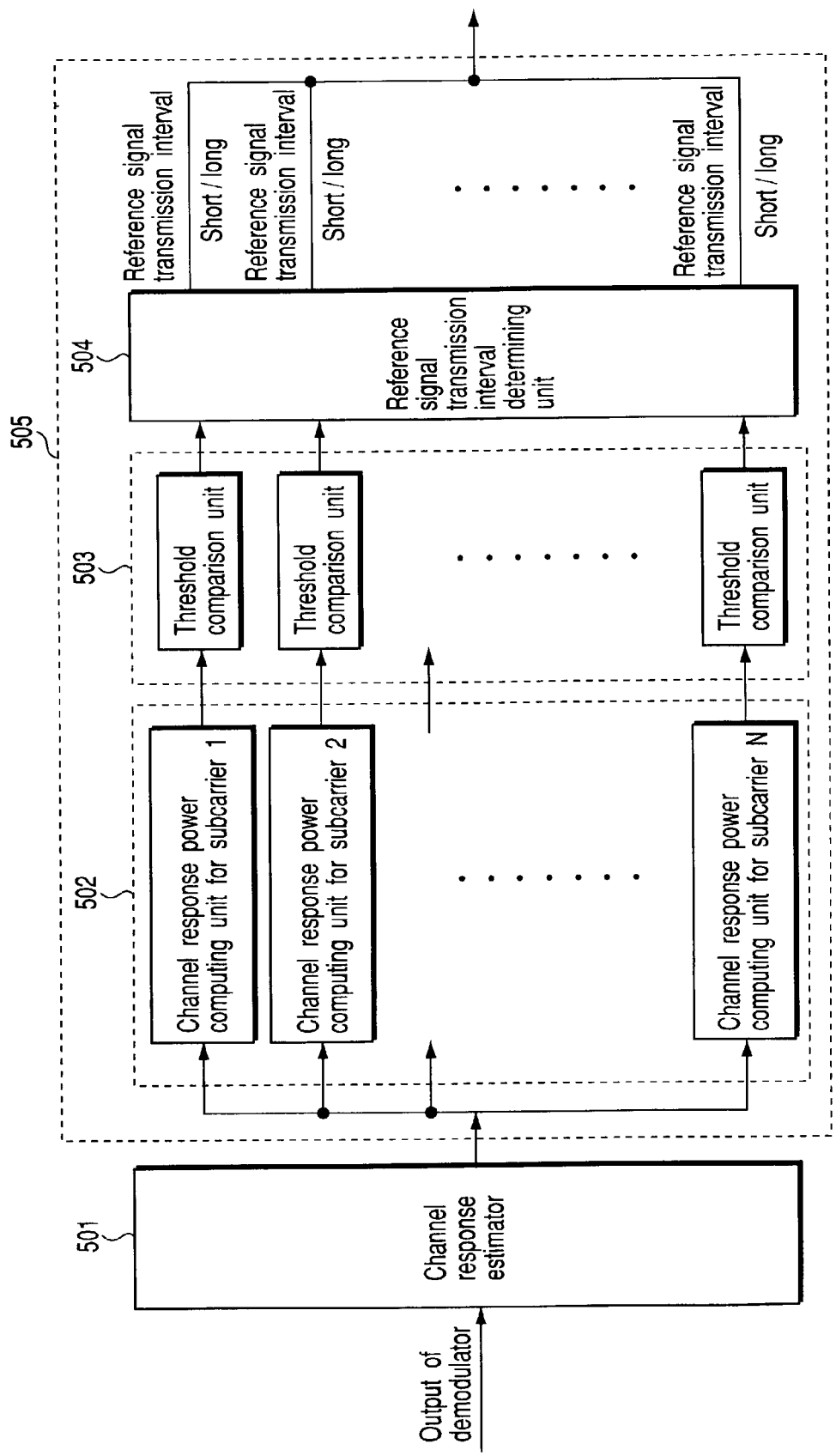
FIG. 5 is a block diagram illustrating a response estimator and reference signal transmission controller employed in the embodiments of the invention.

FIG. 5 shows first examples of the response estimator and reference signal transmission controller. This configuration is used to set the reference signal transmission interval longer for those of the number N of subcarriers, in which the response power exceeds the threshold value. The configuration of FIG. 5 is assumed to be applied to the embodiment of FIG. 3.

In FIG. 5, a reference signal transmission controller 505 (corresponding to the reference signal transmission controller 311 of FIG. 3) comprises the is same number of channel response power computing units 502 for each subcarrier and threshold comparison units 503 as the number N of subcarriers, and a reference signal transmission determining unit 504.

The response data output from a response estimator 501 (corresponding to response estimator 309 in FIG. 3) is input to the channel response power computing unit 502, where response power is computed for each subcarrier. The signal output from the channel response power computing unit 502 is input to the threshold comparison unit 503, where it is subjected to a determination, using a threshold value, as to response power. In other words, whether or not the response power exceeds the threshold value is determined. The signal output from the threshold comparison unit 503 is input to the reference signal transmission determining unit 504. The reference signal transmission determining unit 504 determines reference signal transmission intervals for the subcarriers so that a long reference signal transmission interval is set for the subcarrier in which the response power exceeds the threshold value.

The threshold comparison units 503 may use a single threshold value for all the subcarriers, or may use different threshold values for different subcarriers, or may use a common threshold value for subcarriers fewer than the number N of subcarriers. Further, the threshold value may be a preset fixed value or may be a dynamically variable value.

The determination of the reference signal transmission interval for each subcarrier in accordance with the response power can suppress the degradation of the communication quality, and can reduce the number of transmission intervals of the reference signal.

The configuration shown in FIG. 5 is also applicable to the multi-carrier transmission system shown in FIG. 1. In this case, the modulator 113, transmitter 114, channel 115, receiver 116 and demodulator 117 shown in FIG. 1 are interposed between the response estimator 501 and reference signal transmission controller 505. However, reference signal transmission control is executed in the same manner as the above.

(Second Examples of Transmission Channel Response Estimator and Criterion Signal Transmission Controller)

FIG. 6 shows second examples of the response estimator and reference signal transmission controller. This configuration is used to set the reference signal transmission interval longer for those of the number N of subcarriers, in which the response power exceeds the threshold value. The configuration of FIG. 6 is assumed to be applied to the embodiment of FIG. 3.

In FIG. 6, a reference signal transmission controller 605 (corresponding to the reference signal transmission controller 311 of FIG. 3) comprises the same number of subcarrier correlation computing units 602 and threshold comparison units 603 as the number N of subcarriers, and a reference signal transmission determining unit 604.

The response data output from a response estimator 601 (corresponding to response estimator 309 in FIG. 3) is input to the subcarrier correlation computing unit 602 configured to compute a response correlation between the subcarriers adjacent on the frequency axis. Concerning subcarriers at an end of the frequency axis, the definition of adjacent subcarriers whose correlation is to be computed may be changed.

The correlation output from the subcarrier correlation computing unit 602 is input to the threshold comparison unit 603, where a determination as to whether or not the correlation exceeds the threshold value is executed. The signal output from the threshold comparison unit 603 is input to the reference signal transmission determining unit 604. The reference signal transmission determining unit 604 determines reference signal transmission intervals for all the subcarriers so that a long reference signal transmission interval is set for the subcarriers at which the correlation exceeds a threshold value.

The threshold comparison units 603 may use a single threshold value for all the subcarriers, or may use different threshold values for different subcarriers, or may use a common threshold value for subcarriers fewer than the number N of subcarriers. Further, the threshold value may be a preset fixed value or may be a dynamically variable value.

The determination of the reference signal transmission interval for each subcarrier in accordance with the response correlation of each pair of the subcarriers adjacent on the frequency axis can suppress the degradation of the communication quality and the unnecessary transmission of the reference signal.

If the configuration shown in FIG. 6 is applied to the multi-carrier transmission system shown in FIG. 1, the modulator 113, transmitter 114, channel 115, receiver 116 and demodulator 117 shown in FIG. 1 are interposed between the response estimator 601 and reference signal transmission controller 605. However, reference signal transmission control is executed in the same manner as the above.

(Criterion Signal Deterioration Detector and Criterion Signal Transmission Controller)

Figure 7:
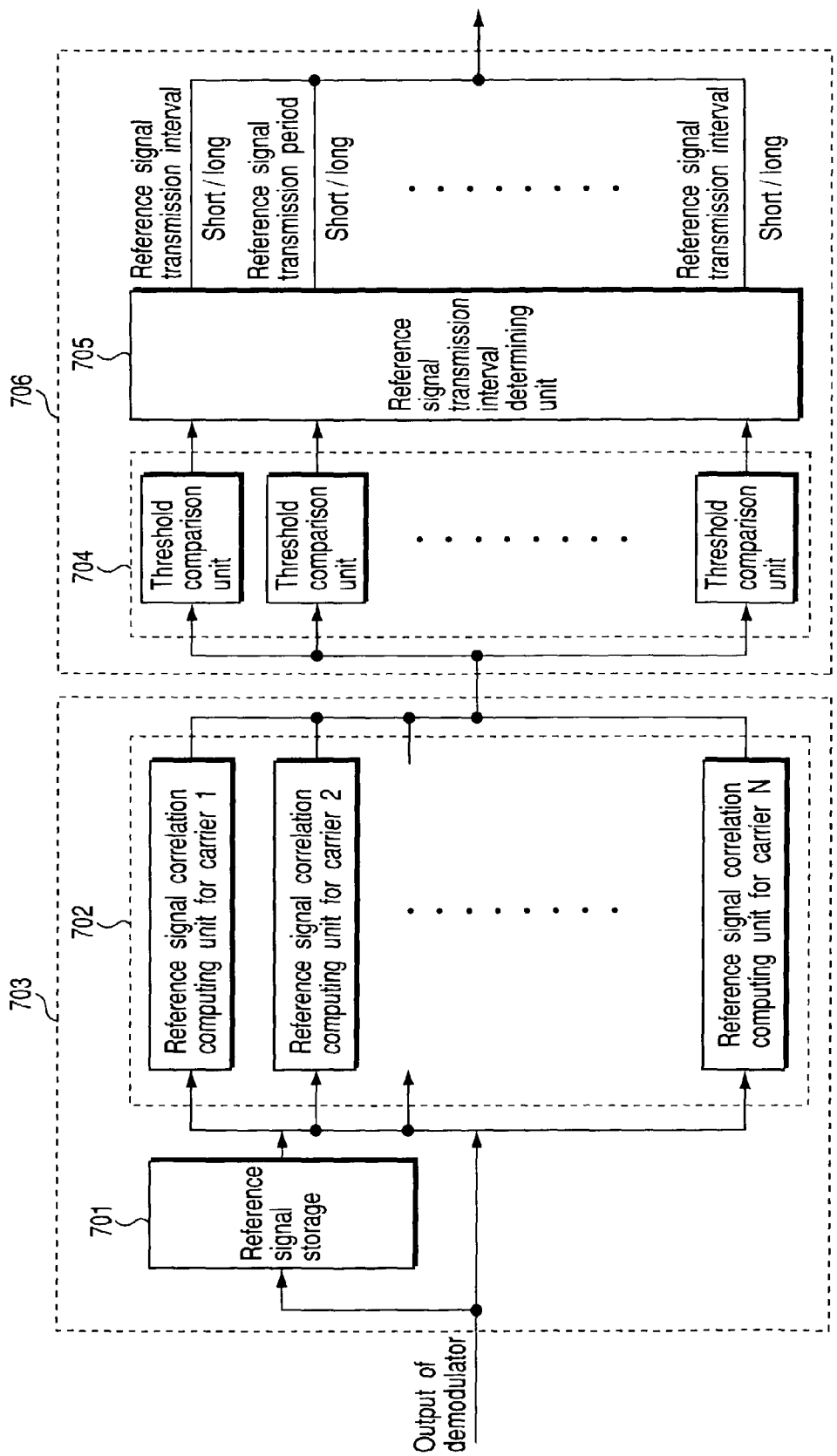
FIG. 7 is a block diagram illustrating a reference signal degradation detector and reference signal transmission controller employed in the embodiments of the invention.

FIG. 7 shows a reference signal degradation detector and reference signal transmission controller. This configuration is used to set the reference signal transmission interval longer for those of the number N of subcarriers, in which the correlation of the previously received reference signal and currently received reference signal exceeds a threshold value. The configuration of FIG. 7 is assumed to be applied to the embodiment of FIG. 3.

A reference signal degradation detector 705 (corresponding to the reference signal degradation detector 308 of FIG. 3) comprises a reference signal memory 701 configured to store a previously received reference signal, and the same number of reference signal correlation computing units 702 as the number N of subcarriers, each computing unit 702 computing the correlation between the previously received reference signal stored in the reference signal memory 701 and the currently received reference signal. The demodulated reference signal output from the demodulator 307 shown in FIG. 3 is input to the reference signal memory 701 and reference signal correlation computing units 702.

The previously received reference signal to be output from the reference signal memory 701 is output therefrom by a predetermined period later and input to the reference signal correlation computing units 702. The previously received reference signal may be the latest received reference signal, or an estimated value calculated from plural reference signals received lately. Each reference signal correlation computing unit 702 computes the correlation between the present reference signal output from the demodulator 307 and the previously received reference signal output from the reference signal memory 701, and outputs it. The correlation output from each reference signal correlation computing unit 702 is input to a reference signal transmission controller 706.

The reference signal transmission controller 706 comprises the same number of threshold comparison units 704 as the number N of subcarriers, and a reference signal transmission determining unit 705. The correlation output from each reference signal correlation computing unit 702 is input to a corresponding threshold comparison unit 704, where it is determined whether or not the correlation exceeds a threshold value. The signal output from each threshold comparison unit 704 is input to the reference signal transmission determining unit 705, where the reference signal transmission interval is determined for the subcarrier so that a long reference signal transmission interval is set for the subcarrier in which the correlation exceeds the threshold value.

The threshold comparison units 704 may use a single threshold value for all the subcarriers, or may use different threshold values for different subcarriers, or may use a common threshold value for subcarriers fewer than the number N of subcarriers. Further, the threshold value may be a preset fixed value or may be a dynamically variable value.

The determination of the reference signal transmission interval for each subcarrier in accordance with the response correlation of each pair of the subcarriers adjacent on the frequency axis can suppress the degradation of the communication quality and the unnecessary transmission of the reference signal.

The configuration shown in FIG. 7 is also applicable to the embodiment shown in FIG. 1. In this case, the modulator 113, transmitter 114, channel 115, receiver 116 and demodulator 117 shown in FIG. 1 are interposed between the reference signal degradation detector 703 and reference signal transmission controller 706. However, reference signal transmission control is executed in the same manner as the above.

(Code Error Detector, Transmission Channel Response Estimator, Criterion Signal Deterioration Detector and Criterion Signal Transmission Controller)

FIG. 8 shows a code error detector, response estimator, reference signal degradation detector and reference signal transmission controller. This configuration is used to set the reference signal transmission interval shorter in accordance with the sum of comparison results of respective threshold values as to the frequency of occurrence of a code error, a response power, a response correlation, and a reference signal degradation amount. FIG. 8 shows the portion of the system related to a subcarrier k, the system being assumed to be applied to the embodiment of FIG. 3.

In FIG. 8, a code error detector 801, response estimator 802 and reference signal degradation detector 803 operate in the same manner as the code error detector 401 of FIG. 4, response estimator 501 of FIG. 5, and reference signal degradation detector 703 of FIG. 7, respectively. A subcarrier code error rate computing unit 807, channel response power computing unit 808 and subcarrier correlation computing unit 809 operate in the same manner as the subcarrier code error rate computing unit 402 of FIG. 4, channel response power computing unit 502 of FIG. 5 and subcarrier correlation computing unit 602 of FIG. 6, respectively.

A threshold comparison unit 810 inputs code error occurrence data output from the subcarrier code error rate computing unit 807, and executes a determination using a threshold value on it. It is defined that the lower the code error rate, the larger value the comparison result has. A threshold comparison unit 811 inputs response power data output from the channel response power computing unit 808, and executes a determination using a threshold value on it. It is defined that the larger the response power, the larger value the comparison result has. A threshold comparison unit 812 inputs a correlation output from the subcarrier correlation computing unit 809, and executes a determination using a threshold value on it. It is defined that the larger the correlation, the larger value the comparison result has. A threshold comparison unit 813 inputs a correlation output from a reference signal correlation computing unit 805, and executes a determination using a threshold value on it. It is defined that the larger the correlation, the larger value the comparison result has.

The thresholds of the threshold comparison units 810–813, which correspond to all the subcarriers, may be the same value for all the subcarriers, or may be different values for different subcarriers, or may be a common value for subcarriers fewer than the number N of subcarriers. Further, the threshold value may be a preset fixed value or may be a dynamically variable value.

A reference signal transmission determining unit 814 is supplied with the comparison results of the threshold comparison units 810–813. The reference signal transmission determining unit 814 computes the sum of the input comparison results, and determines the reference signal transmission interval so that the greater the computation result, the longer the reference signal transmission interval.

The determination of the reference signal transmission interval for each subcarrier, using a plurality of received data, can further reliably suppress the degradation of the communication quality and the unnecessary transmission of the reference signal.

If the configuration shown in FIG. 8 is applied to the multi-carrier transmission system shown in FIG. 1, the modulator 113, transmitter 114, channel 115, receiver 116 and demodulator 117 shown in FIG. 1 are interposed between the code error detector 801, response estimator 802 and reference signal degradation detector 803, and the reference signal transmission controller 806. However, reference signal transmission control is executed in the same manner as the above.

Further, in the configuration of FIG. 8, all the comparison results concerning the frequency of occurrence of a code error, response power, response correlation and reference signal degradation amount. However, arbitrary two or more of the comparison results may be used.

(Third Embodiment)

Although in the above-described embodiments, the reference signal pattern (e.g., reference signal transmission interval) is controlled on the basis of the communication quality (code error rate) or response (response power) of each subcarrier, it may be controlled on the basis of the communication quality or response of each of the subcarrier groups that each include plural subcarriers.

Figure 9:
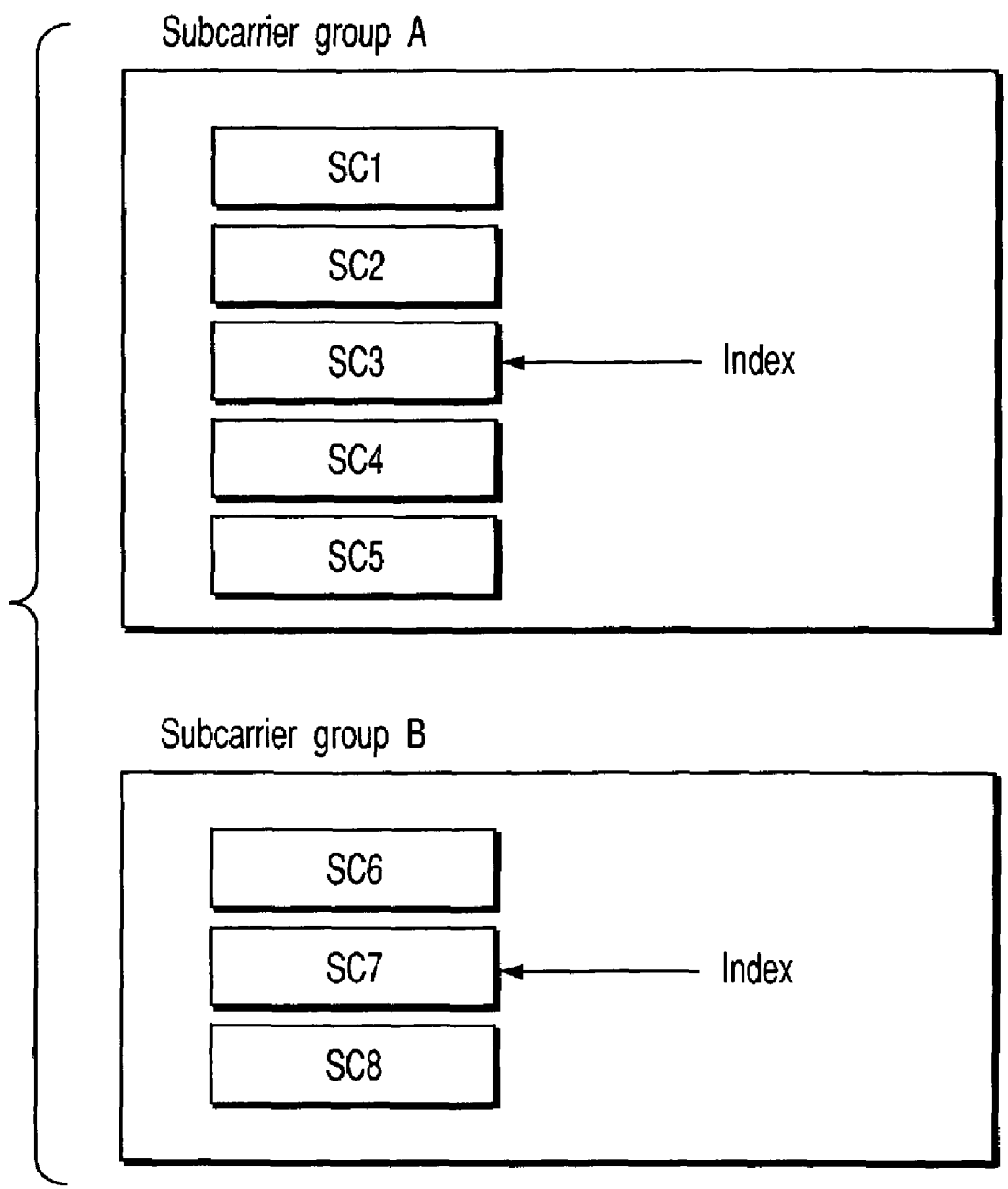
FIG. 9 is a view illustrating examples of subcarrier groups employed in another embodiment of the invention.

FIG. 9 shows a predetermined number of subcarrier groups, into which a number N of subcarriers (N is set to 8 in this embodiment for facilitating the description) are divided. Specifically, subcarriers SC1–SC5 form a subcarrier group A, and subcarriers SC6–SC8 form a subcarrier group B. The subcarriers may be divided in a preset manner, or may be dynamically divided on the basis of, for example, the correlation described referring to FIG. 6.

The reference signal transmission pattern is controlled in units of subcarrier groups on the basis of respective control indexes set for the subcarrier groups A and B. As the control index, the communication quality or response of a subcarrier selected from each of the subcarrier groups A and B, or the average communication quality or response of plural subcarriers selected from each of the subcarrier groups A and B can be used.

FIG. 9 shows the former case. The communication quality or response values of the subcarrier SC3 and SC7 are used as the control indexes of the subcarrier groups A and B, respectively.

The control of the reference signal transmission pattern in units of subcarrier groups reduces the amount of processing executed for reference signal transmission control, thereby suppressing degradation of the communication quality and the unnecessary transmission of the reference signal, with the circuit scale reduced.

Figure 10:
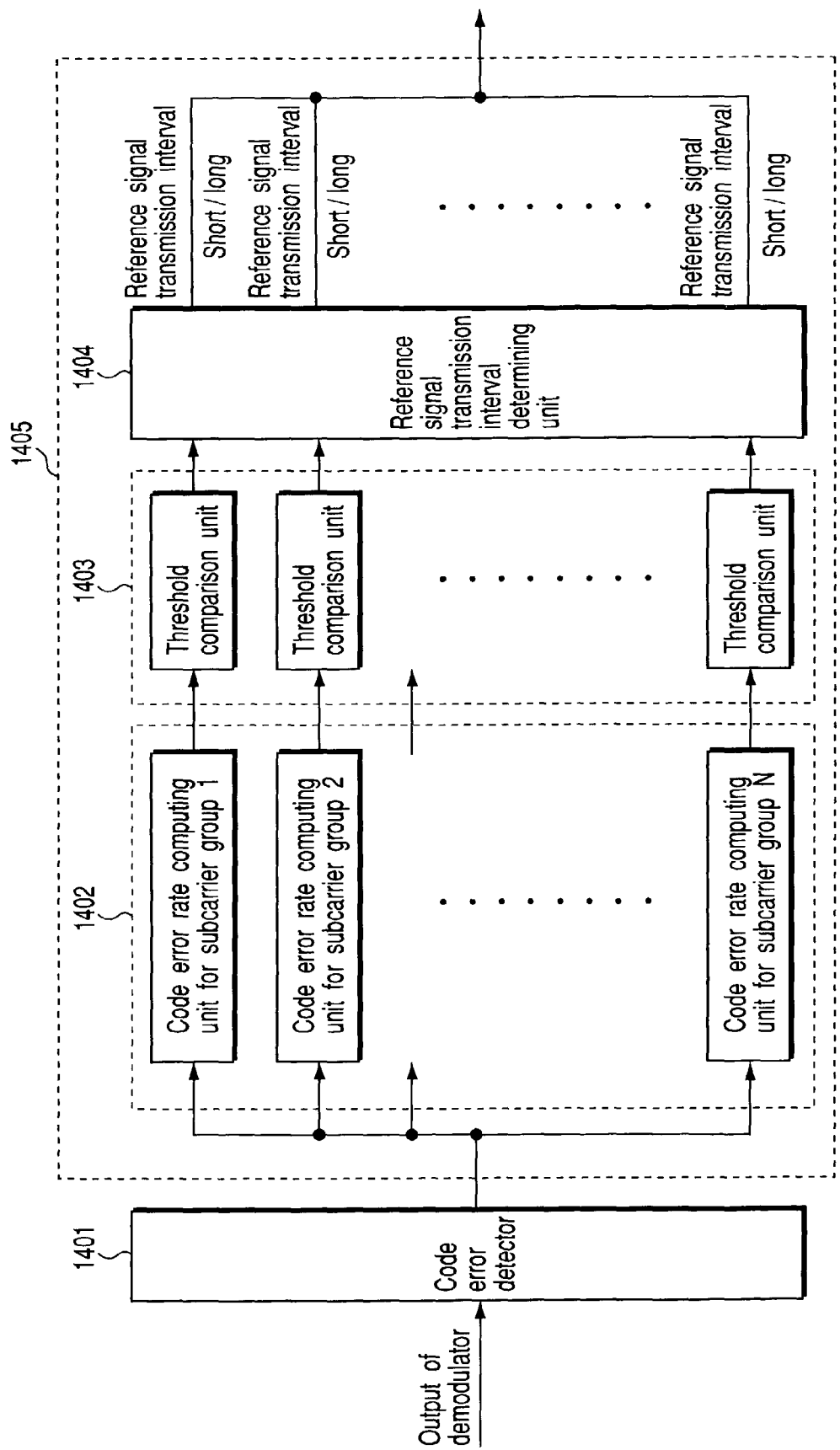
FIG. 10 is a block diagram illustrating a code error detector and reference signal transmission controller employed for subcarrier groups in yet another embodiment of the invention.

FIG. 10 shows a reference signal transmission controller 1405 that uses a subcarrier group code error computing unit 1402 configured to compute a code error in units of subcarrier groups. The reference signal transmission controller 1405 determines the code error rate of each of the subcarrier groups 1, 2, . . . , N that each includes a predetermined number of subcarriers, thereby determining the reference signal transmission interval in units of subcarrier groups. This means that it is not necessary to determine the reference signal transmission interval of each of the large number of subcarriers, and accordingly, the processing time required for determining the reference signal transmission interval can be reduced. The computing of the response power and correlation can also be executed in units of subcarrier groups, and the reference signal transmission interval can be determined on the basis of each of the computing results.

Figure 11:
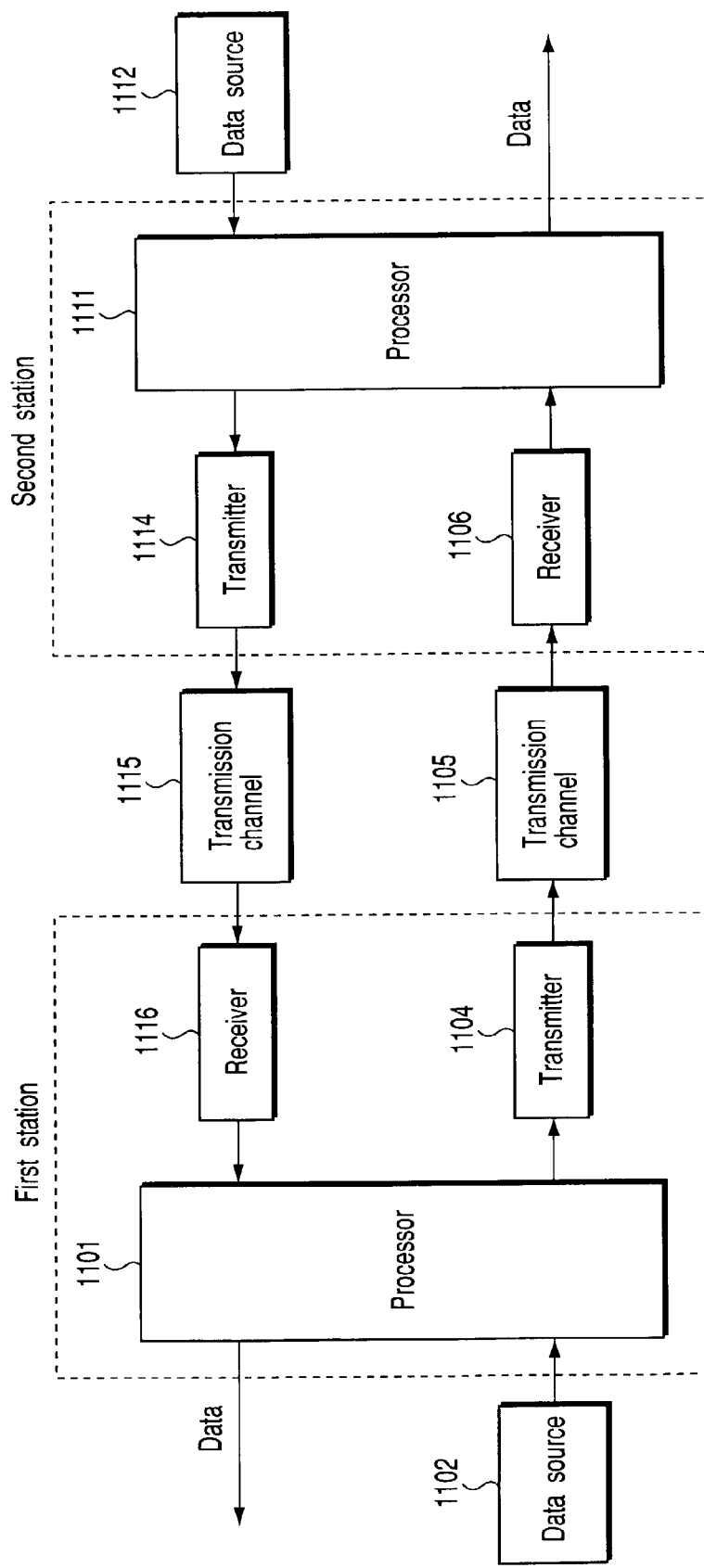
FIG. 11 is a block diagram illustrating a multi-carrier transmission system using a processor, according to a further embodiment of the invention.

FIG. 11 shows a multi-carrier transmission system in which stations 1 and 2 can determine the reference signal transmission interval using software. In this system, processors 1101 and 1111 are provided in the stations 1 and 2, respectively. The processor 1101 of the station 1 comprises an input port for receiving data from a signal source 1102, an output port for outputting data to a transmitter 1104, and a receiver port for inputting data received by a receiver 1116. The transmitter 1104 of the station 1 transmits data to the station 2 via a channel 1105.

The processor 1111 of the station 2 comprises a receiver port for inputting data received by a receiver 1106, an input port for receiving data from a signal source 1112, and an output port for outputting data to a transmitter 1114.

Figure 12:
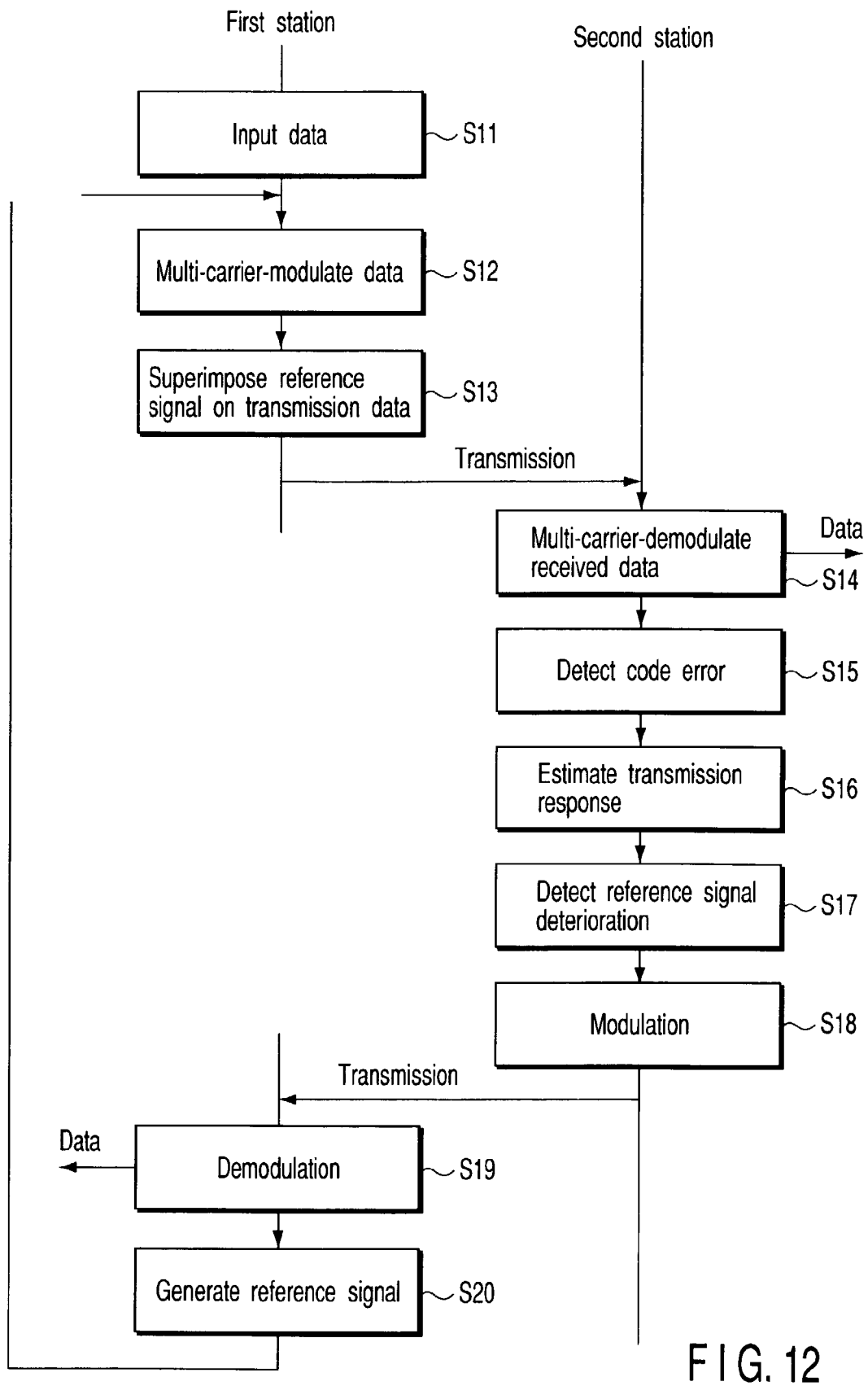
FIG. 12 is a flowchart useful in explaining the operation of the system of FIG. 11.

Referring to FIG. 12, the operation of the multi-carrier transmission system of FIG. 11 will be described.

When transmission data has been input from the signal source 1102 to the processor 1101 (S11), it is subjected to multi-carrier modulation (S12). The reference signal based on reference signal transmission pattern data is superimposed on the transmission data (S13). The transmission data with the reference signal is transmitted to the station 2.

In the station 2, the transmission data from the station 1 is subjected to multi-carrier demodulation (S14). The demodulated data is used as output data and is subjected to code error detection (S15), response estimation (S16) and reference signal degradation detection (step S17). The results of the code error detection, response estimation and reference signal degradation detection are modulated together with transmission data from the signal source 1112 (S18), and is transmitted to the station 1.

In the station 1, data from the station 2 is demodulated (S19). On the basis of the results of the code error detection, response estimation and reference signal degradation detection, the reference signal transmission pattern including the reference signal transmission interval is determined (S20). On the basis of the reference signal transmission pattern, the reference signal transmission interval for each subcarrier is determined. The control of the reference signal transmission pattern, in particular, the reference signal transmission interval, in units of subcarriers can suppress degradation of the communication quality and the unnecessary transmission of the reference signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-carrier communication apparatus which communicates between a first station and a second station as a destination station using a reference signal used for estimating a state of a channel, the multi-carrier communications apparatus comprising:

a multi-carrier modulator which modulates data on a plurality of subcarriers;

a transmission unit configured to transmit the reference signal together with the data modulated to the destination station on every subcarrier; and a control unit configured to control a reference signal transmission pattern according to a given communication condition, the reference signal transmission pattern including a transmission interval of the reference signal transmitted by the transmission unit;

wherein the control unit is further configured to control the reference signal transmission pattern according to at least one of a communication quality in transmitting data to the destination station, a response of the channel, and a degradation degree of the reference signal; and wherein the destination station includes a detection unit configured to detect at least one of the transmission quality, the response, and the degradation degree of the reference signal, and a transmitter which transmits at least one of the transmission quality, the response and the degradation degree of the reference signal to the control unit.

2. A multi-carrier communication apparatus which communicates between a first station and a second station as a destination station using a reference signal used for estimating a state of a channel, the multi-carrier communications apparatus comprising:
- a multi-carrier modulator which modulates data on a plurality of subcarriers;
- a transmission unit configured to transmit the reference signal together with the data modulated to the destination station on every subcarrier; and
- a control unit configured to control a reference signal transmission pattern according to a given communication condition, the reference signal transmission pattern including a transmission interval of the reference signal transmitted by the transmission unit;
- wherein the control unit is further configured to control the reference signal transmission pattern according to at least one of a communication quality in transmitting data to the destination station, a response of the channel, and a degradation degree of the reference signal; and
- wherein the subcarriers are grouped into a plurality of subcarrier groups, and the control unit includes a computing unit configured to compute a rate of the code error as the transmission quality every subcarrier group and a determination unit configured to determine the reference signal transmission interval every subcarrier group according to the rate of the code error.

3. A multi-carrier communication apparatus which communicates between a first station and a second station as a destination station using a reference signal used for estimating a state of a channel, the multi-carrier communications apparatus comprising:
- a multi-carrier modulator which modulates data on a plurality of subcarriers;
- a transmission unit configured to transmit the reference signal together with the data modulated to the destination station on every subcarrier; and
- a control unit configured to control a reference signal transmission pattern according to a given communication condition, the reference signal transmission pattern including a transmission interval of the reference signal transmitted by the transmission unit;
- wherein the control unit is further configured to control the reference signal transmission pattern according to at least one of a communication quality in transmitting data to the destination station, a response of the channel, and a degradation degree of the reference signal; and
- wherein the control unit is further configured to detect a power of the response every subcarrier as the transmission response and control the reference signal transmission pattern every subcarrier according to the power of the response.

4. A multi-carrier communication apparatus according to claim 3,
wherein the control unit is configured to control the reference signal transmission pattern every subcarrier so that the transmission interval increases as the transmission quality is superior.

5. A multi-carrier communication apparatus which communicates between a first station and a second station as a destination station using a reference signal used for estimating a state of a channel, the multi-carrier communications apparatus comprising:
- a multi-carrier modulator which modulates data on a plurality of subcarriers;
- a transmission unit configured to transmit the reference signal together with the data modulated to the destination station on every subcarrier; and
- a control unit configured to control a reference signal transmission pattern according to a given communication condition, the reference signal transmission pattern including a transmission interval of the reference signal transmitted by the transmission unit;
- wherein the control unit is further configured to control the reference signal transmission pattern according to at least one of a communication quality in transmitting data to the destination station, a response of the channel, and a degradation degree of the reference signal; and
- wherein the subcarriers are grouped into a plurality of subcarrier groups, and the control unit is configured to detect a power of the response every subcarrier group and control the reference signal transmission pattern every subcarrier group according to the power of the response.

6. A multi-carrier communication apparatus according to claim 5,
wherein the control unit is configured to control the reference signal transmission pattern every subcarrier so that the transmission interval increases as the transmission quality is superior.

7. A multi-carrier communication apparatus which communicates between a first station and a second station as a destination station using a reference signal used for estimating a state of a channel, the multi-carrier communications apparatus comprising:
- a multi-carrier modulator which modulates data on a plurality of subcarriers;
- a transmission unit configured to transmit the reference signal together with the data modulated to the destination station on every subcarrier; and
- a control unit configured to control a reference signal transmission pattern according to a given communication condition, the reference signal transmission pattern including a transmission interval of the reference signal transmitted by the transmission unit;
- wherein the control unit is further configured to control the reference signal transmission pattern according to at least one of a communication quality in transmitting data to the destination station, a response of the channel, and a degradation degree of the reference signal; and
- wherein the control unit is further configured to use a correlation between the responses corresponding to two of the subcarriers, which are adjacent to each other on a frequency axis, as the transmission response, and control the reference signal transmission pattern every subcarrier according to the correlation.

8. A multi-carrier communication apparatus according to claim 7,
wherein the control unit is configured to control the reference signal transmission pattern every subcarrier so that the transmission interval increases as the correlation increases.

9. A multi-carrier communication apparatus which communicates between a first station and a second station as a destination station using a reference signal used for estimating a state of a channel, the multi-carrier communications apparatus comprising:
- a multi-carrier modulator which modulates data on a plurality of subcarriers;

a transmission unit configured to transmit the reference signal together with the data modulated to the destination station on every subcarrier; and a control unit configured to control a reference signal transmission pattern according to a given communication condition, the reference signal transmission pattern including a transmission interval of the reference signal transmitted by the transmission unit;

wherein the control unit is further configured to control the reference signal transmission pattern according to at least one of a communication quality in transmitting data to the destination station, a response of the channel, and a degradation degree of the reference signal; and wherein the control unit is further configured to use a correlation between a current reference signal and a past reference signal as the degradation degree of the reference signal, and control the reference signal transmission pattern every subcarrier according to the correlation.

10. A multi-carrier communication apparatus according to claim 9, wherein the control unit is configured to control the reference signal transmission pattern every subcarrier so that the transmission interval increases as the correlation increases.

11. A multi-carrier communications apparatus which communicates between a first station and a second station as a destination station using a reference signal used for estimating a state of a channel, the multi-carrier communications apparatus comprising:

a multi-carrier modulator provided in the first station to modulate data on a plurality of subcarriers;

a transmission unit provided in the first station and configured to transmit the reference signal together with the data modulated to the destination station; and a control unit provided in the first station and configured to receive at least one of a communication quality in transmitting data to the destination station, a response of the channel, and a degradation degree of the reference signal which is sent from the destination station, and control a reference signal transmission pattern according to at least one of the communication quality, the response and the degradation degree of the reference signal, the reference signal transmission pattern including a transmission interval of the reference signal transmitted by the transmission unit.

12. A multi-carrier communication apparatus according to claim 11, wherein the control unit includes a computing unit configured to compute a rate of a code error as the transmission quality every subcarrier and a determination unit configured to determine the reference signal transmission interval according to the rate of the code error.

13. A multi-carrier communication apparatus according to claim 11, wherein the subcarriers are grouped into a plurality of subcarrier groups, and the control unit includes a computing unit configured to compute a rate of the code error as the transmission quality every subcarrier group and a determination unit configured to determine the reference signal transmission interval every subcarrier group according to the rate of the code error.

14. A multi-carrier communications apparatus which communicates between a first station and a second station as a destination station using a reference signal used for estimating a state of a channel, the multi-carrier communications apparatus comprising:

a multi-carrier modulator provided in the first station to modulate data on a plurality of subcarriers;

a transmission unit provided in the first station and configured to transmit the reference signal together with the data modulated to the destination station; and a control unit provided in the first station and configured to detect at least one of a communication quality in transmitting data to the destination station, a response of the channel, and a degradation degree of the reference signal which is sent from the destination station, and control a reference signal transmission pattern according to at least one of the communication quality, the response and the degradation degree of the reference signal, the reference signal transmission pattern including a transmission interval of the reference signal transmitted by the transmission unit.

15. A multi-carrier communication apparatus according to claim 14, wherein the subcarriers are grouped into a plurality of subcarrier groups, and the control unit includes a computing unit configured to compute a rate of the code error as the transmission quality every subcarrier group and a determination unit configured to determine the reference signal transmission interval every subcarrier group according to the rate of the code error.

* * * * *